United States Patent
Chen

(10) Patent No.: US 8,582,966 B2
(45) Date of Patent: Nov. 12, 2013

(54) METHOD AND APPARATUS FOR PROTECTION SWITCHING IN PASSIVE OPTICAL NETWORK

(75) Inventor: Charles Chen, Fremont, CA (US)

(73) Assignee: Cortina Systems, Inc., Sunnyvale, CA (US)

( * ) Notice: Subject to any disclaimer, the term of this patent is extended or adjusted under 35 U.S.C. 154(b) by 1552 days.

(21) Appl. No.: 11/898,180

(22) Filed: Sep. 10, 2007

(65) Prior Publication Data

US 2009/0067835 A1 Mar. 12, 2009

(51) Int. Cl.
*H04B 14/00* (2006.01)
*H04B 10/032* (2013.01)

(52) U.S. Cl.
CPC .................. *H04B 10/032* (2013.01)
USPC ......... 398/5; 398/69; 398/70; 398/71; 398/72

(58) Field of Classification Search
USPC .................. 398/151, 5, 69–72; 370/216–228
See application file for complete search history.

(56) References Cited

U.S. PATENT DOCUMENTS

| | | | | |
|---|---|---|---|---|
| 5,357,360 A * | 10/1994 | Imhoff et al. | ................ | 398/100 |
| 5,539,564 A * | 7/1996 | Kumozaki et al. | ................ | 398/2 |
| 5,930,018 A * | 7/1999 | Effenberger | ................ | 398/161 |
| 6,023,467 A * | 2/2000 | Abdelhamid et al. | ..... | 370/236.2 |
| 6,546,014 B1 * | 4/2003 | Kramer et al. | ........... | 370/395.41 |
| 6,650,840 B2 * | 11/2003 | Feldman | ................ | 398/21 |
| 6,771,908 B2 * | 8/2004 | Eijk et al. | ................ | 398/66 |
| 6,778,781 B2 * | 8/2004 | Van Eijk et al. | ................ | 398/100 |
| 6,801,497 B1 * | 10/2004 | Van Driessche | ................ | 370/225 |
| 6,868,232 B2 * | 3/2005 | Eijk et al. | ................ | 398/5 |
| 6,975,586 B1 * | 12/2005 | Yoshimura | ................ | 370/217 |
| 7,152,180 B2 * | 12/2006 | Shoaib et al. | ................ | 714/4.4 |
| 7,181,142 B1 * | 2/2007 | Xu et al. | ................ | 398/66 |
| 7,193,964 B2 * | 3/2007 | Courtney et al. | ............ | 370/228 |
| 7,245,628 B2 * | 7/2007 | Shi et al. | ................ | 370/437 |
| 7,260,119 B2 * | 8/2007 | Sala et al. | ................ | 370/510 |
| 7,330,654 B2 * | 2/2008 | Song et al. | ................ | 398/71 |
| 7,372,854 B2 * | 5/2008 | Kang et al. | ................ | 370/390 |
| 7,379,676 B2 * | 5/2008 | Kang et al. | ................ | 398/168 |
| 7,394,758 B2 * | 7/2008 | Gonda | ................ | 370/218 |
| 7,496,294 B2 * | 2/2009 | Takemoto et al. | ................ | 398/5 |
| 7,512,337 B2 * | 3/2009 | Lee et al. | ................ | 398/20 |
| 7,571,310 B2 * | 8/2009 | Eun et al. | ................ | 713/153 |
| 7,606,489 B2 * | 10/2009 | Chen et al. | ................ | 398/58 |
| 2002/0010792 A1 * | 1/2002 | Border et al. | ................ | 709/238 |
| 2002/0030865 A1 * | 3/2002 | Kawate et al. | ................ | 359/110 |
| 2002/0071149 A1 * | 6/2002 | Xu et al. | ................ | 359/110 |
| 2003/0235205 A1 * | 12/2003 | Song et al. | ................ | 370/466 |
| 2004/0008703 A1 * | 1/2004 | Kim et al. | ................ | 370/401 |
| 2004/0028409 A1 * | 2/2004 | Kim et al. | ................ | 398/71 |
| 2004/0120315 A1 * | 6/2004 | Han et al. | ................ | 370/389 |
| 2004/0208563 A1 * | 10/2004 | Roberts et al. | ................ | 398/70 |
| 2005/0008158 A1 * | 1/2005 | Huh et al. | ................ | 380/256 |
| 2005/0019031 A1 * | 1/2005 | Ye et al. | ................ | 398/19 |

(Continued)

OTHER PUBLICATIONS

Ramaswami et al. "Optical Networks, a practical perspective" second edition 2002, pp. 388-390.*

*Primary Examiner* — Danny Leung

(57) ABSTRACT

Systems and methods for performing protection switching in a passive optical network are provided. When a fiber cut is detected, control and management plane applications are not immediately informed. A rapid re-registration procedure is instigated upon detection of a fiber cut event. This allows multiple optical network units to re-register quickly without restarting control and management applications.

20 Claims, 10 Drawing Sheets

(56) References Cited

U.S. PATENT DOCUMENTS

| | | | |
|---|---|---|---|
| 2005/0135609 A1* | 6/2005 | Lee et al. | 380/30 |
| 2005/0249498 A1* | 11/2005 | Haran et al. | 398/58 |
| 2006/0093356 A1* | 5/2006 | Vereen et al. | 398/33 |
| 2007/0116466 A1* | 5/2007 | Gewirtzman et al. | 398/71 |
| 2007/0217788 A1* | 9/2007 | Gao et al. | 398/5 |
| 2008/0259786 A1* | 10/2008 | Gonda | 370/218 |
| 2008/0285972 A1* | 11/2008 | Takeuchi et al. | 398/60 |
| 2009/0067835 A1* | 3/2009 | Chen | 398/45 |

\* cited by examiner

METHOD AND APPARATUS FOR PROTECTION SWITCHING IN PASSIVE OPTICAL NETWORK

FIELD OF THE INVENTION

The invention relates to methods and systems for protection switching in passive optical networks.

BACKGROUND OF THE INVENTION

Access networks connect business and residential subscribers to the central offices of service providers, which in turn are connected to metropolitan area networks (MANs) or wide area networks (WANs). Access networks are commonly referred to as the last mile or first mile, where the latter term emphasizes their importance to subscribers. In today's access networks, telephone companies deploy digital subscriber loop (xDSL) technologies and cable companies deploy cable modems. Typically, these access networks are hybrid fiber coax (HFC) systems with an optical fiber based feeder network between central office and remote node and an electrical distribution network between the remote node and subscribers.

These access technologies are unable to provide enough bandwidth to current high-speed Gigabit Ethernet local area networks (LANs) and evolving services, e.g., distributed gaming or video on demand. Future first-mile solutions not only have to provide more bandwidth but also have to meet the cost-sensitivity constraints of access networks arising from the small number of cost sharing subscribers.

In so-called FTTx access networks, the copper based distribution part of access networks is replaced with optical fiber, e.g., fiber-to-the-curb (FTTC) or fiber-to-the-home (FTTH). In doing so, the capacity of access networks is sufficiently increased to enable the provision of broadband services to subscribers. Due to the cost sensitivity of access networks, these all-optical FTTx systems are typically unpowered and consist of passive optical components, e.g., splitters and couplers. Accordingly, they are called passive optical networks (PONs). PONs attracted a great deal of attention well before the Internet spurred bandwidth growth. There are generally two types of PONs that are defined by international standard bodies. Ethernet Passive Optical Networks, known as EPON, is ratified by the IEEE 802 standards committee. Gigabit Passive Optical Networks, known as GPON is defined by ITU-T.

An example of a topology for a PON is illustrated in FIG. 1. Typically, a PON has a physical tree topology with the central office located at the root and the subscribers connected to the leaf nodes of the tree. In FIG. 1, at the root of the tree is an optical line termination (OLT) 10 which is the service provider equipment residing at the central office. The OLT 10 is the gateway that connects to the global Internet 34. The PON connects the OLT 10 to multiple optical line units (ONUs) 22,24,26 through a 1:N optical splitter/combiner 14. In the illustrated example, there are N ONUs, but only three are illustrated, specifically labeled "ONU 1" 22, "ONU 2" 24, . . . , "ONU N" 26. More specifically, a shared optical fiber 12 connects the OLT 10 to the 1:N optical splitter/combiner 14, and a respective optical fiber 16,18,20 connects the 1:N optical splitter/combiner to each ONU 22,24,26.

An ONU can serve a single residential or business subscriber, referred to as Fiber-to-the-Home/Business (FTTH/B), or multiple subscribers, referred to as Fiber-to-the-curb (FTTC). Each ONU can be connected to one or more multimedia devices such as telephone, computer and television set. In a specific example ONU 22 is shown connected to telephone 28, computer 30, television 32.

Due to the directional properties of the optical splitter/combiner 14, the OLT 10 is able to broadcast data to all ONUs 22,24,26 in the downstream direction. In the upstream direction, however, ONUs 22,24,26 cannot communicate directly with one another. Instead, each ONU 22,24,26 is able to send data only to the OLT. Thus, in the downstream direction a PON may be viewed as a point-to-multipoint network and in the upstream direction, a PON may be viewed as a multipoint-to-point network.

It is important to note that the upstream bandwidth is time shared by all ONUs, and only one ONU can transmit data to the OLT at a time to avoid traffic collision. The OLT arbitrates which ONU can transmit data at a time and the duration of such transmission. This operation is known as dynamic bandwidth allocation or DBA.

Since multiple ONUs share the same fiber bandwidth, it is important to protect any fiber failure since such an event would disrupt the service to many customers. Particularly, it is important for mission critical applications. Loss of customer traffic for a certain period of time could lead to significant revenue loss for service providers which offer services over such a network.

Protection switching can be used to protect against fiber failure by providing a redundant path. An example of this is illustrated in FIG. 2. The PON of FIG. 2 is basically the same as the PON of FIG. 1, and common reference numbers have been used where appropriate, with the following exceptions:
a) instead of a single fiber 12 as was the case in FIG. 1, there is a trunk fiber pair 40 between the OLT 10 and a remote optical splitter 42, where one fiber is configured to be active and the other standby; and
b) the remote optical splitter 42 has a 2:N splitting/combining function as opposed to the 1:N splitting/combining function of FIG. 1.

This configuration is known as 1:1 protection switching configuration, in which the active fiber initially carries data traffic. Once the active fiber cut has been detected, data traffic will be restored onto the standby fiber.

Protection switching generally has two phases. The first phase is to detect a fiber cut, and the time to detect such an event is referred to as the fiber cut detection time. Following the first phase, the second phase is to restore the impacted traffic onto the standby fiber, and the time to restore the traffic completely is referred to as the traffic restoration time. The sum of the detection time and restoration time, during which data traffic is lost, is collectively referred to as the protection switching time. Protection switching time is the most important measure for a protection switching scheme. The established industry standard calls for it to be less than or equal to 50 ms. This could be relaxed to sub-100 ms for Internet real time applications such as voice over IP.

For downstream traffic, the OLT broadcasts content for all of the ONUs on a single broadcast channel. Addressing is used to identify the appropriate ONU for each packet. For upstream traffic, the OLT controls the time sharing of the bandwidth between the ONUs by indicating to each ONU when it is allowed to transmit upstream traffic thereby avoiding collisions. When a new ONU enters into the PON network the OLT will not be aware of it and will not allocate any upstream capacity to it. To allow for new ONUs to join, the OLT periodically allocates a "discovery window". The allocation is signaled on the downlink broadcast channel, so all ONUs including a new ONU that has not yet registered can receive it. A discovery window is a time that is specifically reserved for new ONUs to join. The new ONU first needs to register with the OLT. This is achieved by the ONU sending a registration request to the OLT during one of the discovery windows. Typically, a three-way handshaking is performed to complete the registration process. During this process, the ONU is assigned a unique ID by the OLT. This ID or related information is carried in the data and control traffic to identify which ONU is sending (upstream) and to identify which ONU is an intended receiver (downstream).

Once the ONU is registered, applications need to establish certain control and management protocols between the OLT and the registered ONU, before normal traffic can be sent or received by the ONU. Authentication protocol (e.g. 802.1x), keep-alive protocol (e.g. OAM protocol), and multicast registration protocol (e.g. IGMP snooping) are good examples of such protocols.

Each ONU subscribes to services offered by the service provider, based on a so-called service level agreement (SLA). Among other policy terms and conditions, the SLA contains the quality of service (QoS) requirements for bandwidth and delay, which is referred to as a traffic profile. The bandwidth information includes committed information rate (CIR), peak information rate (PIR), and burst size (BS). The delay information includes bounded delay and jitter. The traffic profile is used for the purpose of bandwidth allocation among ONUs in the upstream direction of the PON system. The objective of the bandwidth allocation is to ensure that ONUs will gain fair access to the available bandwidth based on their respective traffic profiles. Based on the traffic profiles, the OLT will periodically send bandwidth allocations to the registered ONUs, in response to bandwidth requests.

The OLT periodically allocates a discovery window that allows ONUs to register. When more than one ONU attempts to register simultaneously, a collision will occur. Each ONU then backs off randomly to avoid a possibility of future collisions.

In the 1:1 protection configuration as illustrated in FIG. 2, there is a short period of time that an ONU experiences the loss of light when the active fiber is cut. It is extremely difficult, if not prohibitive, to preserve the timing information across the switchover at the ONU. In other words, ONU re-registration in the event of fiber cut is inevitable. Once the ONU detects a fiber cut event, it will deregister with the OLT and start a new registration process from the beginning. Such a process is time consuming and could take a few seconds or a minute to complete. The most time consuming functions to perform are related to the establishment of control and management protocols between applications running on the ONU and the OLT. The typical three-way handshaking registration itself can be achieved very fast, given the high speed link between the OLT and an ONU.

Similarly, when the OLT detects the loss of communication with one or more ONUs, it will clear the state information associated with them such as ONU ID, registration information and use profiles. This will lead to the reset of associated applications in the control and management plane. Typically, the OLT detects the communication loss through one of several keep-alive protocols such as MPCP or OAM in the case of EPON, and the detection time is in the neighbourhood of 50 milliseconds (MPCP) or one second (OAM) depending on the protocol used. The normal detection mechanism is certainly inefficient from protection switching perspective.

SUMMARY OF THE INVENTION

The invention is related to effective methods and systems for protection switching in passive optical networks. It provides a method to detect fiber cut quickly in the order of one or few milliseconds. It further provides a rapid re-registration method to allow the previously registered ONUs to establish communication with the OLT again. In some embodiments this is done in a predictable and deterministic manner. As a result of this, the data path between those ONUs and the OLT can be restored. Finally, in some embodiments, steps are provided to avoid and eliminate the restart of the control and management plane that would normally occur upon detection of a fiber cut. Consequently, the methods may reduce protection and restoration time.

According to one broad aspect, the invention provides a method of performing protection switching in a passive optical network, the method comprising: configuring protection switching over an active fiber and a standby fiber; performing fiber cut detection and switching from the active fiber to the standby fiber; performing data path restoration through a rapid re-registration procedure; performing graceful restoration of control and management plane.

In some embodiments, the method applied in a passive optical network comprising an OLT (optical line termination) and at least one ONU (optical network unit), wherein performing fiber cut detection comprises: the OLT performing at least one of: a) monitoring received traffic, and if there is no received traffic received from any registered ONU within a configured period of time, declaring a fiber cut; b) if an expected protocol message is not received from any registered ONU within a configured time interval, declaring a fiber cut; and c) monitoring an optical signal, and declaring a fiber cut when there is a loss of optical signal; each ONU performing at least one of: d) monitoring received traffic, and if there is no received traffic received within a configured period of time, declaring a fiber cut; e) if an expected protocol message is not received within a configured time interval, declaring a fiber cut; and f) monitoring an optical signal, and declaring a fiber cut when there is a loss of optical signal.

In some embodiments, the method applied in a passive optical network comprising an OLT (optical line termination) and at least one ONU (optical network unit), wherein performing data path restoration through a rapid re-registration procedure comprises: the OLT advertising re-registration window information that allows multiple ONUs to re-register quickly after detecting a fiber cut, and the ONUs performing re-registration in accordance with the re-registration window information.

In some embodiments, the method applied in a passive optical network comprising an OLT (optical line termination) and at least one ONU (optical network unit), wherein performing data path restoration through a rapid re-registration procedure comprises: the OLT advertising a respective re-registration window for each ONU that was registered prior to detection of a fiber cut, and each ONU performing re-registration using the respective re-registration window.

In some embodiments, the method applied in a passive optical network comprising an OLT (optical line termination) and at least one ONU (optical network unit), wherein performing data path restoration through a rapid re-registration procedure comprises: the OLT advertising at least one re-registration window that is longer than a window used for initial registration, and the ONUs performing re-registration during the at least one re-registration window.

In some embodiments, the method applied in a passive optical network comprising an OLT (optical line termination) and at least one ONU (optical network unit), wherein performing data path restoration through a rapid re-registration procedure comprises: the OLT advertising a re-registration window that has a respective dedicated slot for re-registration for each ONU, and each ONU performing re-registration using the respective dedicated slot.

In some embodiments, the method applied in a passive optical network comprising an OLT (optical line termination) and at least one ONU (optical network unit), wherein performing data path restoration through a rapid re-registration procedure comprises: on an ongoing basis, the OLT maintaining data plane state for each ONU, the data plane state comprising at least an ONU ID; during re-registration, the OLT assigning each ONU the same ONU ID as had been previously maintained.

In some embodiments, the data plane state comprises at least one of: ONU ID (ONU identifier), MAC address, LLID (logical link identifier), ONU traffic profiles, GEM (GPON encapsulation method) Port Identifier, and GPON Allocation ID.

In some embodiments, the method applied in a passive optical network comprising an OLT (optical line termination) and at least one ONU (optical network unit), wherein performing data path restoration through a rapid re-registration procedure comprises: upon detecting a fiber cut, the OLT making all upstream bandwidth available for re-registration until all ONUs have been re-registered successfully.

In some embodiments, the method applied in a passive optical network comprising an OLT (optical line termination) and at least one ONU (optical network unit), wherein performing graceful restoration of control and management plane comprises: upon a successful re-registration using the standby fiber, switching the control and management plane over to the standby fiber; the OLT restarting at least one application used by the OLT only upon detection that both the active and standby fibers have failed; the ONU restarting the at least one application used by the ONU as a result of detecting the fiber cut only after attempting to re-register has failed to succeed within a timeout window following detecting the fiber cut.

In some embodiments, the method applied in a passive optical network comprising an OLT (optical line termination) and at least one ONU (optical network unit), wherein performing graceful restoration of control and management plane comprises: the OLT managing interactions between the active fiber and standby fiber and the control and management plane by: grouping the active fiber and the standby fiber into a protection switching group and presenting this as a single port to the control and management plane; providing port information to applications pertaining to the single port by: a) providing a down event upon determining both fibers have failed; b) providing an up event upon transitioning from a state in which both fibers have failed to a state in which at least one fiber is functional.

In some embodiments, the ONU restarting the at least one application used by the ONU after attempting to re-register has failed to succeed within a timeout window following detecting the link failure comprises: defining the timeout window to be a GRDI (graceful recovery dead interval); upon detecting a link failure, withholding link failure event from the at least one application, and starting a timer; upon the timer reaching the GRDI, informing the at least one application of the link failure; the at least one application restarting in response to being informed of the link failure.

According to another broad aspect, the invention provides an optical network unit (ONU) for use in a passive optical network, the optical network unit comprising: an optical transceiver; a fiber cut detector that performs fiber cut detection in respect of a link for which there is an active fiber and a standby fiber; at least one peer application running on a processor; a MAC controller that performs data path restoration through a rapid re-registration procedure upon detection of a fiber cut by the fiber cut detector; an interface manager that, after detection of a fiber cut by the fiber cut detector, informs the at least one peer application of the fiber cut event only after expiry of a graceful recovery dead interval thereby performing graceful restoration of control and management plane.

In some embodiments, the fiber cut detector is configured to perform fiber cut detection by performing at least one of: a) periodically monitoring received traffic, and if there is no received traffic received within a configured period of time, declaring a fiber cut; b) if an expected protocol message is not received within a configured time interval, declaring a fiber cut; and c) monitoring an optical signal, and declaring a fiber cut when there is a loss of optical signal.

In some embodiments, the MAC controller is configured to performing data path restoration through a rapid re-registration procedure by: receiving re-registration window information that allows multiple ONUs to re-register quickly after detecting a fiber cut, and the ONU performing re-registration in accordance with the re-registration window information.

In some embodiments, the MAC controller is configured to performing data path restoration through a rapid re-registration procedure by: receiving a dedicated re-registration window for the ONU and the ONU performing re-registration using the respective re-registration window.

In some embodiments, the MAC controller is configured to performing data path restoration through a rapid re-registration procedure by: receiving a re-registration window that has a respective dedicated slot for re-registration for each of a plurality of ONU, and the ONU performing re-registration using the dedicated slot for that ONU.

According to another broad aspect, the invention provides an optical line termination (OLT) comprising: a fiber cut detector that performs fiber cut detection in respect of a link for which there is an active fiber and a standby fiber; at least one peer application running on a processor; a MAC controller that performs data path restoration through a rapid re-registration procedure upon detection of a fiber cut by the fiber cut detector; an interface manager that informs the at least one peer application of the fiber cut event only after determination both the active and standby fibers have failed.

In some embodiments, the fiber cut detector is configured to perform fiber cut detection by performing at least one of: a) monitoring received traffic, and if there is no received traffic received from any registered ONU within a configured period of time, declaring a fiber cut; b) if an expected protocol message is not received from any registered ONU within a configured time interval, declaring a fiber cut; and c) monitoring an optical signal, and declaring a fiber cut when there is a loss of optical signal.

In some embodiments, the MAC controller is configured to perform data path restoration by advertising re-registration window information that allows multiple ONUs to re-register quickly after detecting a fiber cut.

In some embodiments, the MAC controller is configured to perform data path restoration by advertising a respective re-registration window for each of at least one ONU that was registered prior to detection of a fiber cut, and processing received requests for re-registration using the respective re-registration windows.

In some embodiments, the MAC controller is configured to perform data path restoration by advertising at least one re-registration window that is longer than a window used for initial registration, and processing received requests for re-registration from ONUs during the at least one re-registration window.

In some embodiments, the MAC controller is configured to perform data path restoration by advertising a re-registration window that has a respective dedicated slot for re-registration for each ONU, and processing received re-registration requests received during the dedicated slots.

In some embodiments, the MAC controller is configured to perform data path restoration by on an ongoing basis, maintaining data plane state for each ONU, the data plane state comprising at least an ONU ID, and during re-registration, the assigning each ONU the same ONU ID as had been previously maintained.

In some embodiments, the interface manager is configured to group the active fiber and the standby fiber into a protection switching group and presenting this as a single port to the control and management plane; providing port information to the at least one peer application pertaining to the single port by: a) providing a down event upon determining both fibers have failed; b) providing an up event upon transitioning from a state in which both fibers have failed to a state in which at least one fiber is functional.

BRIEF DESCRIPTION OF THE DRAWINGS

Embodiments of the invention will now be described with reference to the attached drawings in which.

DETAILED DESCRIPTION OF THE PREFERRED EMBODIMENTS

Figure 1:
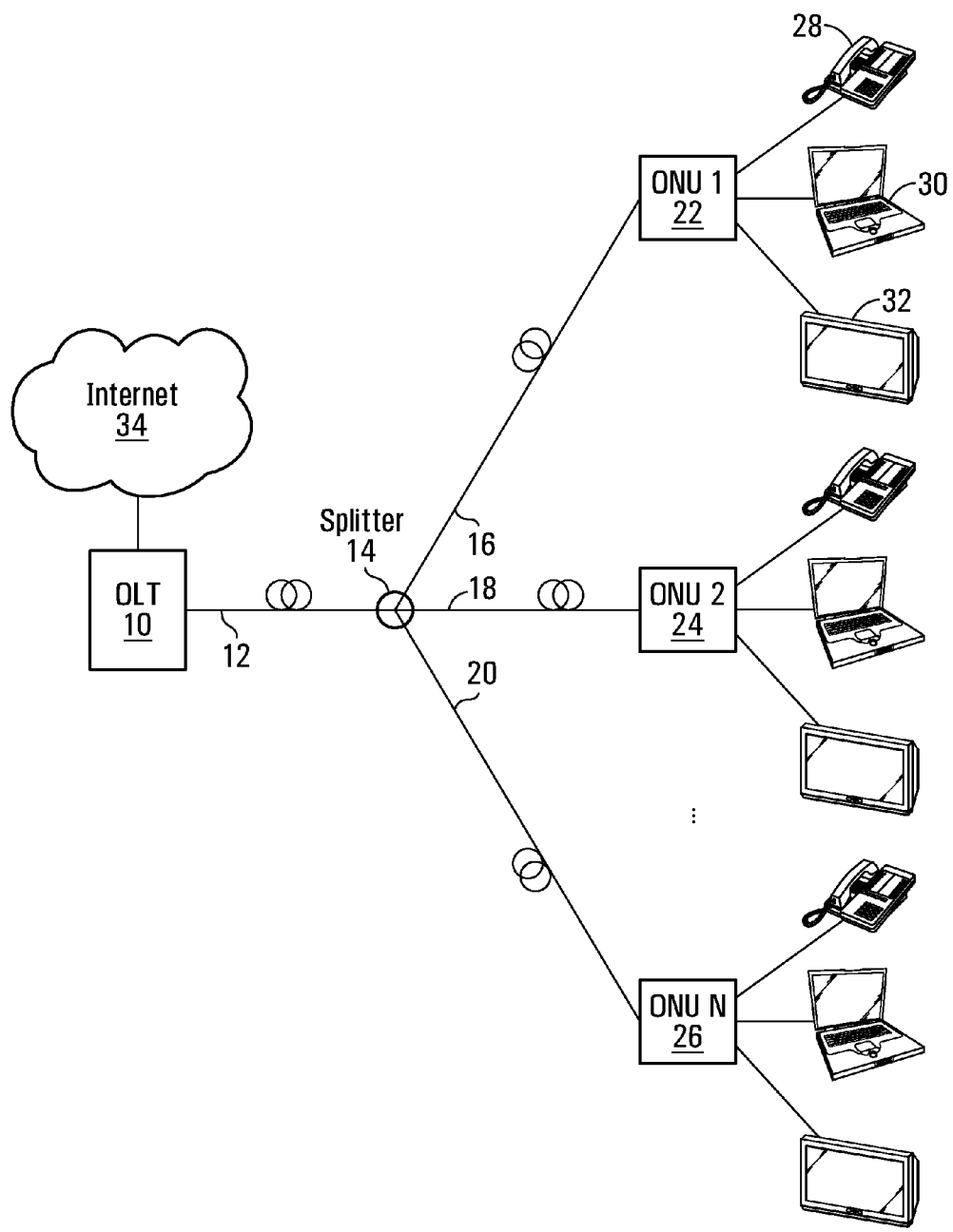
FIG. 1 is a block diagram of an example of a PON network architecture.
Figure 2:
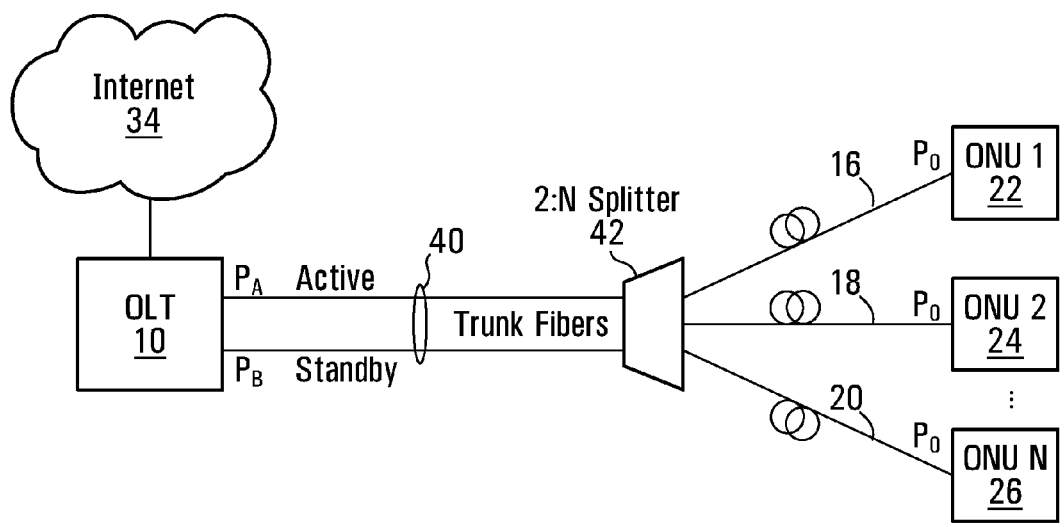
FIG. 2 is a block diagram of an example of a PON network architecture featuring 1:1 protection switching.
Figure 3:
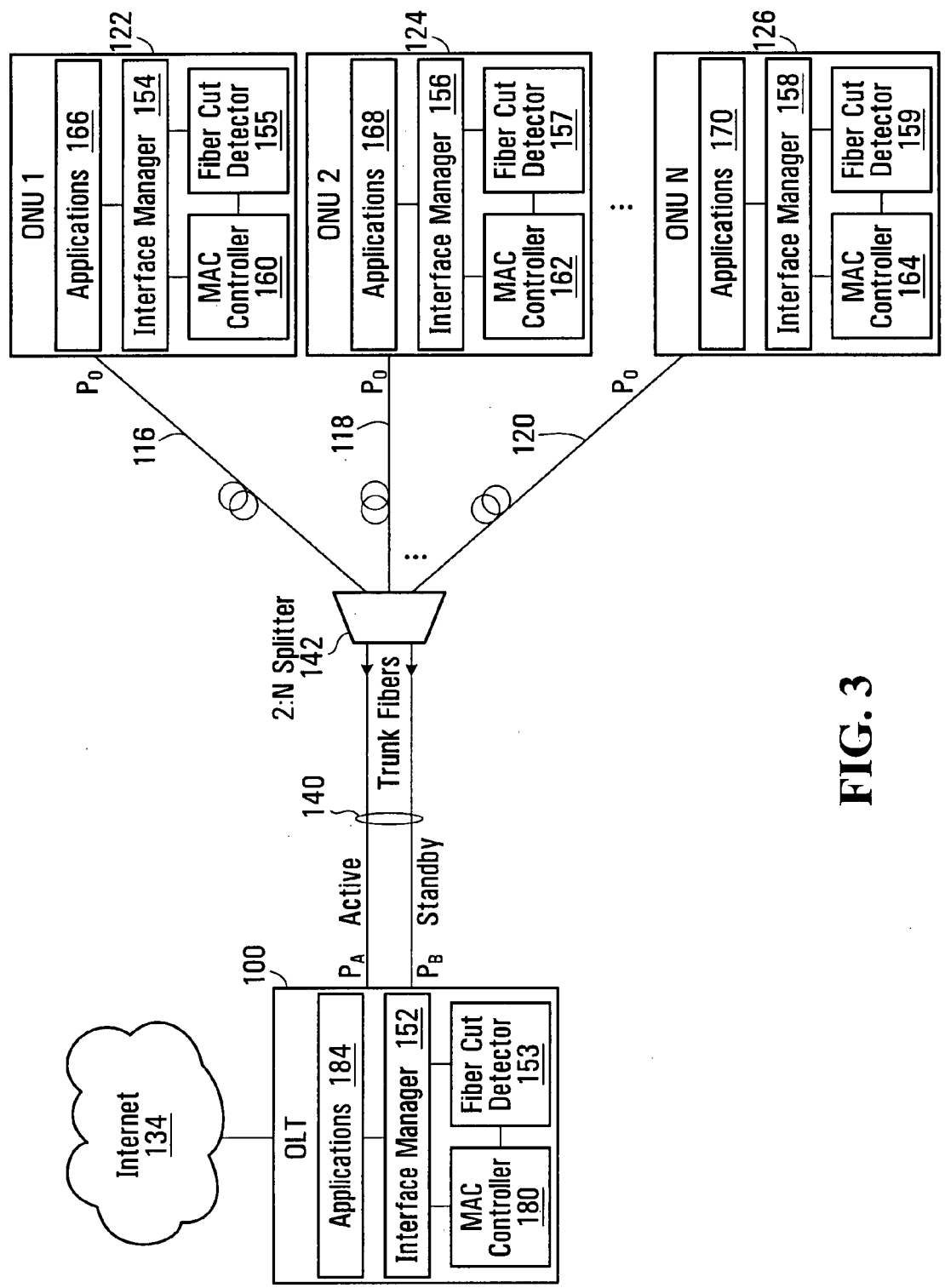
FIG. 3 is a block diagram of an example of a PON network architecture featuring 1:1 protection switching in accordance with an embodiment of the invention.

Referring now to FIG. 3, shown is an example of PON provided by an embodiment of the invention. Shown is an optical line termination (OLT) 100 which is the service provider equipment residing at the central office. The OLT 100 is the gateway that connects to the global Internet. 134. The PON connects the OLT 100 to multiple optical line units (ONUs) 122,124,126 through a 2:N optical splitter/combiner 142. In the illustrated example, there are N ONUs, but only three are illustrated, specifically labeled "ONU 1" 122, "ONU 2" 124, "ONU N" 126. More specifically, a pair of optical trunk fibers 140 connects the OLT 100 to the 2:N optical splitter/combiner 142, and a respective optical fiber 116,118,120 connects the 2:N optical splitter/combiner to each ONU 122,124,126.

The OLT 100 has an OLT interface manager 152 that is responsible for managing interactions between applications of the OLT and the pair of optical trunk fibers 140. The OLT 100 has a fiber cut detector 153 that is responsible for performing fiber cut detection. In addition, the OLT 100 has a MAC controller 180. A set of one or more applications running on the OLT are indicated at 184.

Similarly each ONU 122,124,126 has a respective ONU interface manager 154,156,158, MAC controller 160,162, 164 and fiber cut detector 155,157,159. Each ONU 122,124, 126 has applications 166,168,170. The applications 166,168, 170 of the ONUs 122,124,126 communicate with the peer applications 184 of the OLT 100.

In operation, on the OLT side, the interface manager 152 provides the fiber port information to the applications 184 such as the up or down event of the port. An application depends upon the service of the interface manager 152 to determine whether the communication with its peer application on the ONUs has been lost or not. In some embodiments, as described later, the interface manager 152 creates a logical interface or port that is associated with two fibers, active and standby for protection purposes.

The fiber cut detector 153 monitors the state of the active fiber. Example methods of performing fiber cut detection are detailed below. The fiber cut detector 153 informs the OLT interface manager 152 in the event that a fiber cut has been detected on the active fiber. The MAC controller 180 is responsible for the point-to-multiple point protocol between the OLT 100 and ONUs 122,124,126 including registration and upstream bandwidth allocation. In normal operation, the MAC controller 180 operates on the active fiber, and will switch the communication to the standby fiber upon the fiber cut. In some embodiments, the MAC controller 180 is responsible for initial ONU registration by periodically broadcasting discovery window in the downstream channel.

In operation, on the ONU side, the ONU interface managers 154,156,158 of ONUs 122,124,126 provide the interface service to their applications 166,168,170. The MAC controllers 160,162,164 establish registration and communication with the OLT MAC controller 180. The fiber cut detectors 155,157,159 monitor and detect fiber cut events, in respect of the active fiber connecting the OLT 100 to the 2:N splitter/combiner 142, and in turn inform the respective interface managers 154,156,158 upon detection of such an event. In some embodiments, fiber cut detection is performed using one of the example methods described below. In another embodiment, an optical transceiver (not shown) in each ONU simply determines when there is a loss of light in the downstream direction. This is possible on the ONU side since nominally there is always some light in the downstream direction when the link is up. In either case, the ONU is not actually able to conclude that the failure is on the optical link for which there is a standby path (i.e. the trunk fibers 140 of FIG. 3) as opposed to elsewhere in the network, such as the fiber connecting the 2:N splitter 142 to a given ONU. However, the assumption is made that the failure is on the optical link for which there is a standby path. In the event an ONU is unable to re-register as described below, then either the standby path failed as well, or there is a failure elsewhere in the network. Thus, while components 155,157,159 are referred to as fiber cut detectors, they might more accurately be referred to as communication discontinuity detectors.

Figure 4:
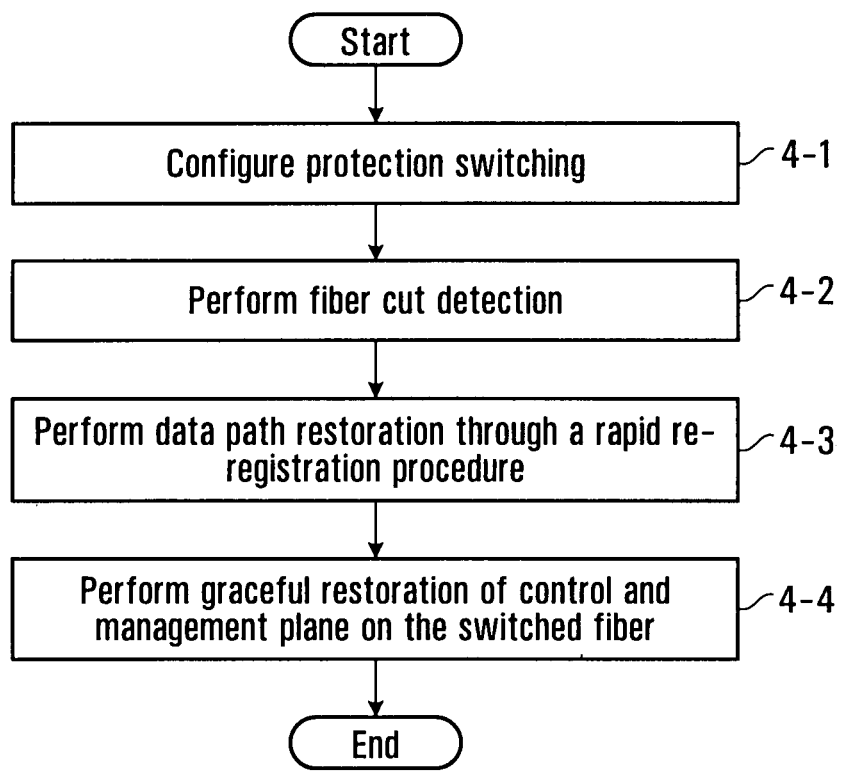
FIG. 4 is a flowchart of a method of performing protection switching in accordance with an embodiment of the invention.

Referring now to the flowchart of FIG. 4, a method for an OLT and ONUs to participate in performing protection switching will now be described. This method may be implemented, for example, using the configuration of FIG. 3. The method begins at step 4-1 which configures participating OLT and ONUs to be in protection switching mode. Of course, if the OLT and ONUs are always in protection switching mode, then there is no need for such an initial configuration step. In some embodiments, this simply involves setting one initial fiber port to be the active port, and setting the other port to be the standby port.

In step 4-2, the fiber cut detectors continually monitor the operation of the active fiber, and performs fiber cut detection. Detailed examples are provided below. The faster the OLT is able to detect a fiber cut, the faster the protection switching. In step 4-3, the data path is restored by using a rapid re-registration procedure. The re-registration procedure is "rapid" in the sense that multiple ONUs are able to quickly perform re-registration using the procedure in contrast to the normal registration procedure which is not designed to accommodate many registrations within a short time interval. In some embodiments, the rapid procedure employs knowledge of the number of ONUs that had been registered before the fiber cut occurs. By doing so, the time it takes to restore the registration and data path can be significantly reduced. Specific examples of rapid re-registration procedures are provided below. Finally, in step 4-4, after the switch over, the control and management plane is restored gracefully as the fiber has been switched from active to standby. This involves the peer applications starting to communicate over the new active fiber. As part of the protection switching methodology taught herein, the applications in the control and management plane are intentionally kept unaware of the protection switching event, so as to avoid the restart of them.

Figure 5A:
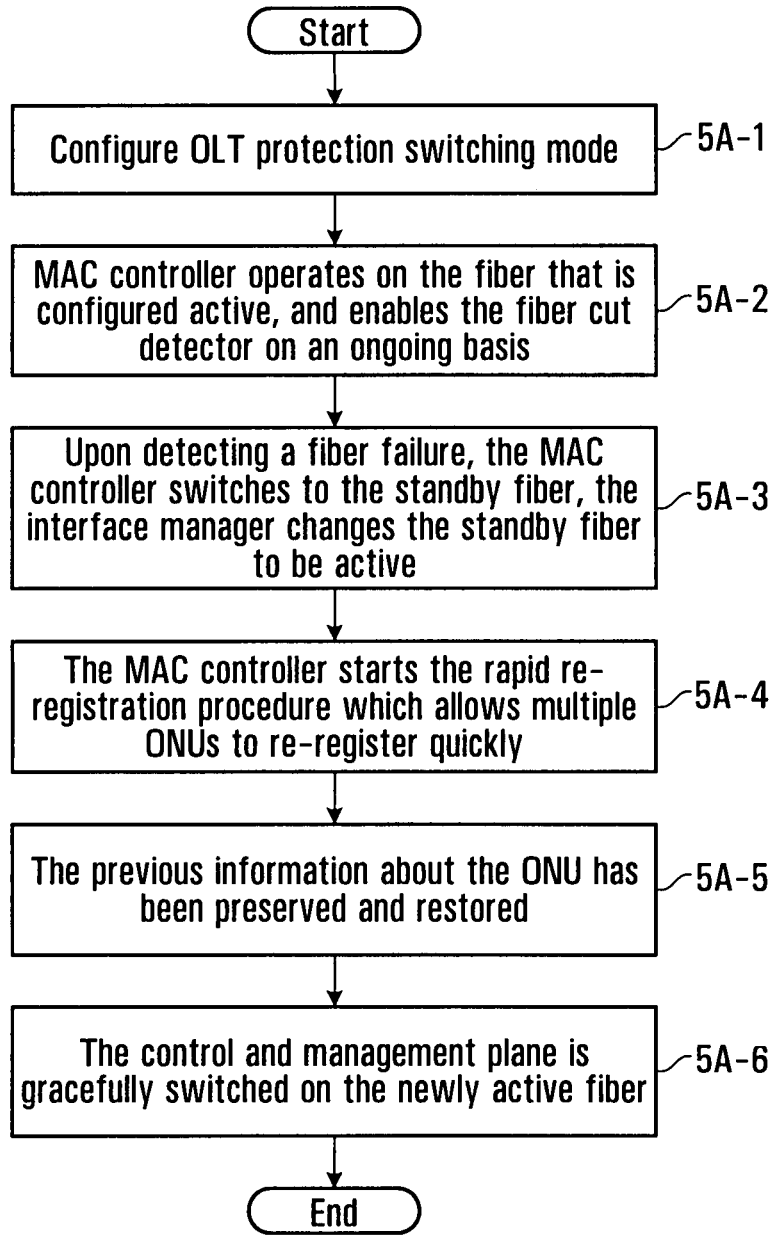
FIGS. 5A and 5B are flowcharts of methods for an OLT to participate in protection switching.
Figure 5B:
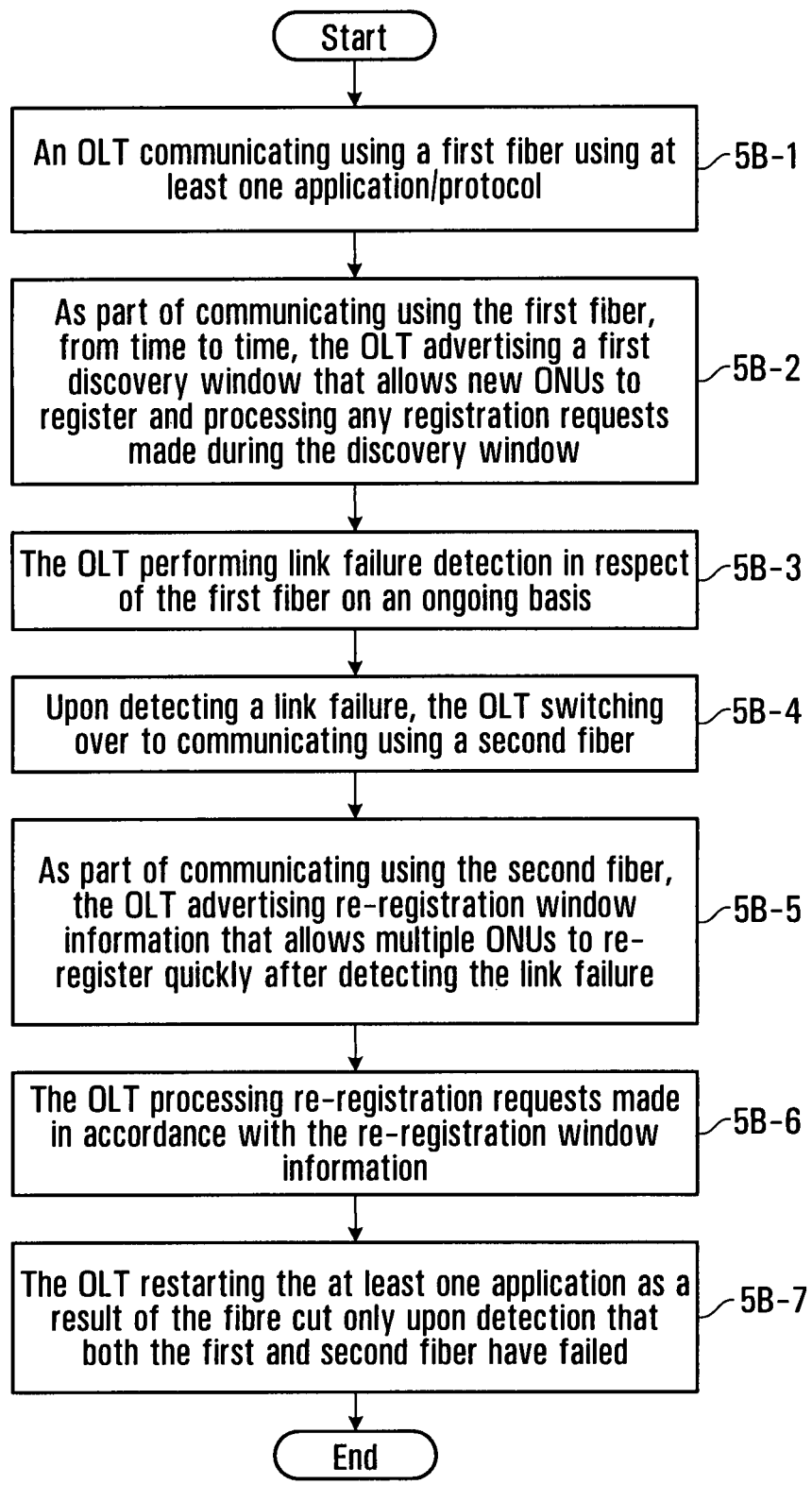
Figure 6A:
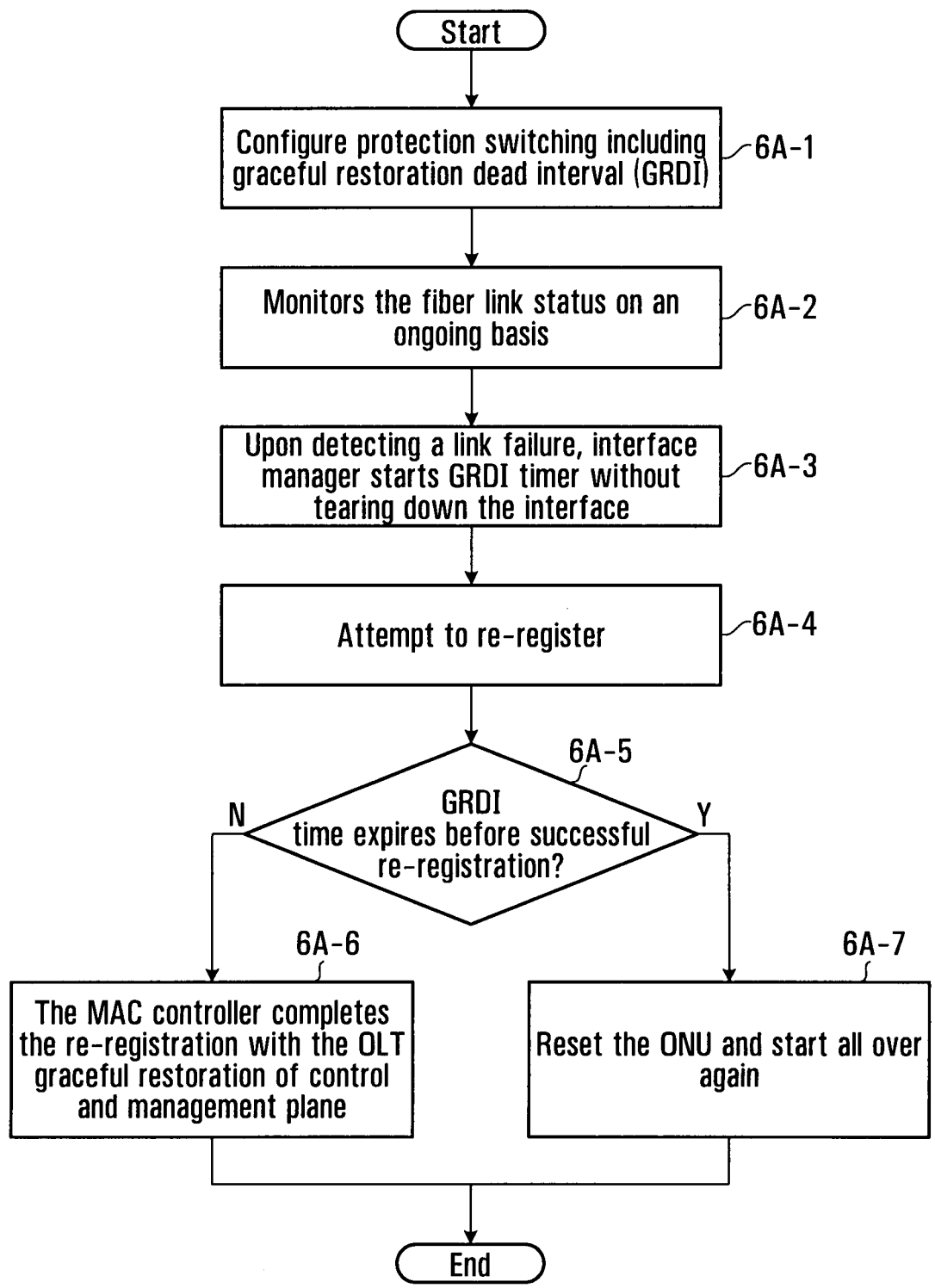
FIGS. 6A and 6B are flowcharts of methods for an ONU to participate in protection switching.
Figure 6B:
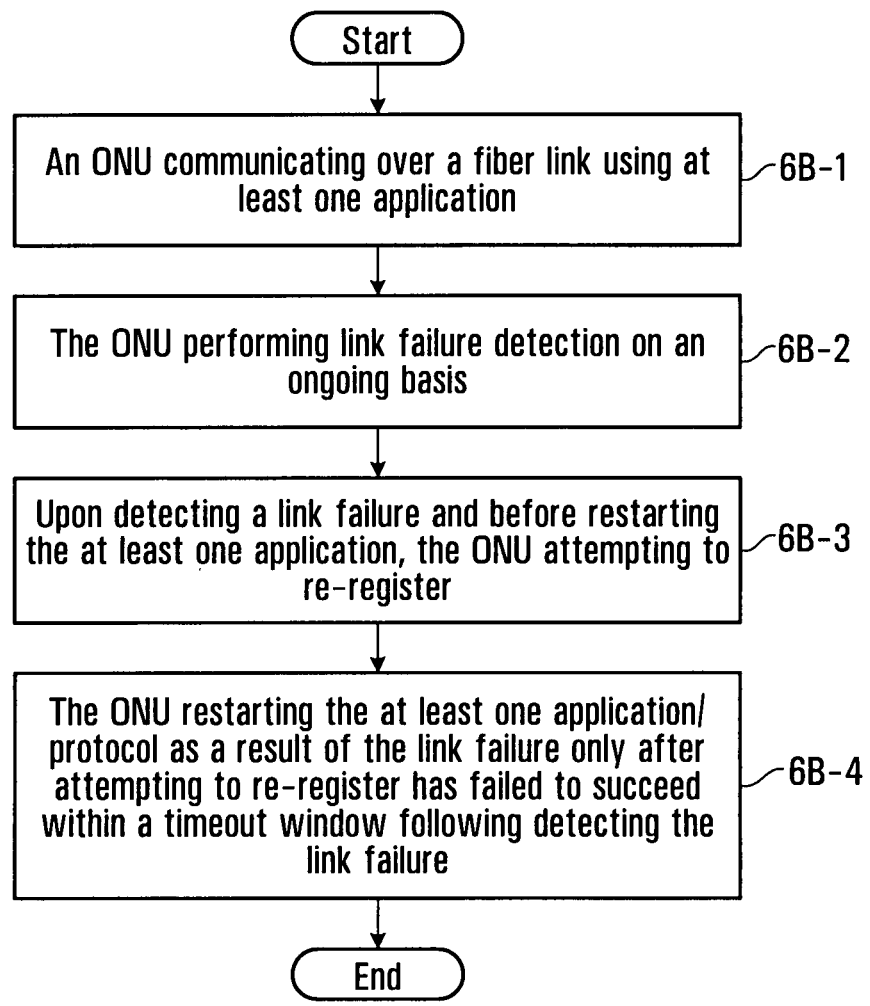

FIGS. 5A and 5B are flowcharts of methods for execution by an OLT to participate in protection switching. FIGS. 6A and 6B are flowcharts of methods for execution by an ONU to participate in protection switching. Example implementations of the steps of FIGS. 5A, 5B, 6A and 6B have been described previously and further details are provided below. Typically, in an overall system implementation, both of these methods would be executed in concert. However, it is to be understood that they are also separate embodiments of the invention.

Furthermore, another embodiment provides an OLT that executes the method of FIG. 5A or 5B. An OLT will also include whatever other functionality is necessary to function as an optical line termination, much of which will be implementation specific. In some embodiments, the method steps described are implemented by software running on a processor forming part of the OLT. Another embodiment provides a computer readable medium containing such instructions.

Yet another embodiment provides an ONU that executes the method of FIG. 6A or 6B. The ONU will also include whatever other functionality necessary to function as an optical network unit, much of which will be implementation specific. In some embodiments, the method steps described are implemented by software running on a processor forming part of the ONU. Another embodiment provides a computer readable medium containing such instructions.

Referring now to FIG. 5A, a flowchart of a method for execution by an OLT will now be described. The method begins at step 5A-1 with the configuration of the OLT (optical line termination) protection switching mode.

Next, in step 5A-2, the MAC controller operates in the active fiber and registers all ONUs that are connected to the fiber. The registration information such as ONU ID, ONU MAC address and user profile is maintained by the MAC controller and interface manager at the OLT. The MAC controller also enables the fiber cut detector on an ongoing basis. In some embodiments, if enabled, the MAC controller periodically sends a discovery window to allow a new ONU which enters into the network to register with the OLT. This discovery window is sent at a low frequency interval to reduce a potential overhead.

In step 5A-3, upon detecting an active fiber cut event, the fiber cut detector of the OLT reports the active fiber cut event to both interface manager and MAC controller. The MAC controller switches to the standby fiber upon detection of active fiber cut. In turn, the interface manager changes the standby fiber to be active.

In step 5A-4, the MAC controller starts the rapid re-registration procedure which allows previously registered ONUs to re-register again over the newly active fiber. In some embodiments, this involves advertising a re-registration window until ONUs have all been re-registered successfully. Several effective methods that reduce or avoid re-registration collision during the re-registration window are described below. Other methods can be employed as well.

In step 5A-5, the information of the previously registered ONUs are preserved and maintained during the re-registration procedure. For example, the same ONU ID will be assigned to each ONU by the OLT. This is important to allow the operation of the control and management plane to continue in a transparent manner.

In step 5A-6, the control and management plane is switched onto the newly active fiber, in which the communication between the OLT and ONUs has been established in the previous step. The applications resume the communication in a transparent way with their peers at respective ONUs over the newly active fiber.

Referring now to FIG. 5B, a flowchart of another method for execution by an OLT will now be described. The method begins at step 5B-1 with an OLT communicating using a first fiber using at least one application. Next, in step 5B-2, as part of communicating using the first fiber link, from time to time, the OLT advertising a discovery window that allows new ONUs to register and processing any registration requests made during the discovery window. In step 5B-3, the OLT performs link failure detection in respect of the first fiber on an ongoing basis. In step 5B-4, upon detecting a link failure, the OLT switches over to communicating using a second fiber. In step 5B-5, as part of communicating using the second fiber, the OLT advertises re-registration window information that allows multiple ONUs to re-register quickly after detecting the link failure. Specific examples are detailed below. In step 5B-6, the OLT processes re-registration requests made in accordance with the re-registration window information. In some embodiments, the additional step 5B-7 is performed. This involves the OLT restarting the at least one application as a result of the fiber cut only upon detection that both the first and second fiber have failed.

Referring now to FIG. 6A, a flowchart of a method for execution by an ONU will now be described. The method beings at step 6A-1 with the configuration of the ONU protection switch mode. For this specific example, this involves configuring a graceful restoration dead interval (GRDI), whose typical value ranges from one to ten seconds, but more generally this can be set on an application specific basis.

Next, at step 6A-2 the ONU performs fiber link failure detection on an ongoing basis.

In step 6A-3, upon detecting a link failure, it also starts the GRDI timer. This timer is used to prevent the ONU from a dead lock situation in which the control and management plane at the ONU stays operational, while its counterpart at the OLT has been torn down. This can occur in two scenarios. The first scenario is the protection switching failure, for example, due to both active and standby fiber cut. The second scenario is that the fiber cut takes place from the optical splitter to the ONU itself. In this case, the OLT will not perform protection switching, and so it will tear down the communication with the ONU. When the OLT has reset the applications (thinks the ONU is no longer connected), the ONU should reset its peer communication with the OLT. This is to avoid the situation where the OLT thinks the ONU is disconnected, while the ONU thinks it is connected to the OLT. At step 6A-4, the ONU attempts to re-register. In some embodiments, this involves waiting for a re-registration window, although other mechanisms are possible as detailed below. While this is ongoing, the fiber cut event is withheld from the control and management plane.

In step 6A-5, in the event of GRDI time expiration before successful re-registration, the method continues with step 6A-7, and otherwise the method continues with step 6A-6.

In step 6A-6, the MAC controller completes the re-registration with the OLT successfully. The control and management plane resumes operation without any impact.

Step 6A-7 is executed when the GRDI timer expires before a successful re-registration, the fiber down event is finally conveyed to the control and management plane, and in response to this, the ONU will reset and restart all over again. This may for example involve deletion of prior registration information such as assigned ONU ID and any protocol states.

Referring now to FIG. 6B, a flowchart of another method for execution by an ONU will now be described. The method beings at step 6B-1 with an ONU communicating over a fiber link using at least one application. Next, at step 6B-2 the ONU performs link failure detection on an ongoing basis. In step 6B-3, upon detecting a link failure and before restarting the at least one application, the ONU attempts to re-register. In step 6B-4, the ONU restarts the at least one application as a result of the link failure only after attempting to re-register has failed to succeed within a timeout window following detecting the link failure. Note that it is possible that the ONU may restart the application for other reasons.

Example implementations for some of the steps introduced above will now be described.

Fiber Cut Detection

Fiber cut detection is the very first step to perform protection switching. Two example schemes that the OLT can adopt to achieve the objective are described here, but more generally, any approach to performing fiber cut detection can be employed. The first scheme is to periodically monitor traffic in the upstream direction. There is always at least control and management traffic in the upstream over a certain time period, as long as there is at least one ONU registered with the OLT. If no traffic is received within a configured period of time, the OLT can declare an active fiber failure. The configured time interval is implementation specific, for example on the order of a few milliseconds. Note that the OLT can distinguish from a failure on the trunk fiber between the OLT and the splitter/combiner as opposed to a failure on a link from the splitter/combiner to a specific ONU. In the former case, traffic from all ONUs will cease, whereas in the latter case, traffic from the specific ONU will have ceased. Thus, in some embodiments, before declaring a fiber cut, the OLT waits until it can be verified that no traffic has been received from any ONU for a configured time period.

The second method is to rely on a certain control protocol periodically exchanged between the OLT and ONU. In the case of EPON, multi-point control protocol (MPCP) is periodically exchanged between the OLT and an ONU. In each DBA cycle time, which is typically around 1 millisecond, the OLT expects to receive at least one MPCP report message from each ONU. This is known as a force report mode of operation. If the OLT does not receive such messages from all currently registered ONUs within one cycle time, it can declare an active fiber failure. This is a very effective method.

It is noted that only one message missing from a particular ONU does not trigger the fiber cut event. This may be due the fiber cut between the optical splitter and that ONU itself. This fiber path is obviously not protected. If this happens, OLT will eventually detect the de-registration of that ONU in a normal way.

The ONU can perform fiber cut detection in a manner similar to that described for the OLT. In another embodiment, the ONU can detect the loss of light based on the optical transceiver attached to the fiber. The reason is as long as the OLT is active, there is always light or signal in the downstream channel.

Data Plane Restoration (Rapid Re-Registration Process)

As mentioned earlier, it is extremely difficult and complex to avoid the ONU re-registration in the case of the active fiber cut. The difficulty and complexity comes from the fact that the ONU relies upon the OLT to synchronize its local clock. To keep upstream traffic time shared effectively, all local clocks at ONUs need to be in synchronization. Any time drift would result in traffic collision or loss. In the event of light loss, the local clock at the ONU is no longer guaranteed to be in a synchronized state. This is particularly the case for EPON, where the only way to recover the local lock is to go through the three-way handshaking registration process.

Various approaches are provided that accelerate the re-registration process as soon as the fiber cut has been detected. These are referred to herein collectively as "Rapid Re-Registration Process", or RRP. In some embodiments, RRP allocates a re-registration window (RRP re-registration window) time that is longer than the normal discovery window time. The RRP re-registration window is advertised on the downlink broadcast channel that all ONUs can see as soon as the fiber is switched over to the protection fiber. The RRP re-registration window time is long enough to allow all previously registered ONUs to send registration requests to the OLT. In the simplest embodiment, the RRP re-registration window is repeated until all ONUs have been re-registered again. With this approach, the ONUs will attempt to register, and there will be collisions. Each ONU will re-attempt with a random back-off. Since the OLT keeps sending RRP re-registration windows, all ONUs should be able to re-register, even with more than one attempt. This approach is obviously subject to a possible longer delay in the re-registration process than some of the other examples described below. Its major advantage is its simplicity and requires no special hardware support.

In another embodiment, an RRP is provided which avoids registration request collision during the RRP re-registration window by leveraging the prior knowledge of how many ONUs were previously registered. This is possible because protection switching is a controlled and provisioned process, and its purpose is to recover for those previously already registered ONUs.

The OLT maintains data plane state such as the ONU ID and related ONU information so it can assign the same information back during the re-registration process. A state is dynamic information which an entity maintains. In addition, the OLT maintains control and management plane state. Some state information is shared by both data plane and control plane.

Examples of data plane state include ONU Traffic Profiles, Provisioned information, GEM (GPON Encapsulation Method) Port Identifier, GPON Allocation ID.

Examples of control and management plane state include 802.1x protocol state, IGMP snooping state, Internal management and control protocol states, and Registration information (LLID and MAC addresses).

More generally, the data plane function is to forward packets, and the data plane state is implementation specific. The control and management plane function is to manage and control a system, and the control and management state is implementation specific.

Consistent information is important for the last step of control and management plane recovery detailed below. In the case of EPON, the OLT may, for example, maintain a table of registered ONU MAC addresses and associated LLIDs (logical link identifiers) assigned by the OLT during the initial registration process.

In some embodiments, the OLT asks each ONU to re-register individually. This is achieved by giving each ONU an individual grant window which allows the given ONU to send registration request upstream. During normal operation, a discovery window is sent using a broadcast address format which allows all ONUs to receive. This allows a newly arrived ONU which has not registered with the OLT to register. Such an ONU will not yet have an assigned ONU ID and as such it cannot communicate with the OLT in a unicast fashion and thus cannot receive the individual grant referred to above. However, during a protection switching operation, the OLT has the prior knowledge of how many ONUs were registered at the time when the switch-over takes place. More importantly, each ONU which is configured to be in a protection switching mode will preserve the ONU ID information during the switch-over. Therefore, it allows the OLT to send an individual grant window to each previously registered ONU, so as to eliminate any possible registration request collision, as was the case previously described. The number of individual grants to be sent is equal to the number of ONUs that was previously registered. In the case of EPON, such an individual grant may include specific LLID (ONU ID) information in the preamble of a general GATE or grant message, so that it is only received by a specific ONU associated with the LLID.

In another embodiment, a broadcast re-registration window is employed, but each ONU is configured to send a registration request at a different time within the re-registration window so it does not overlap with others sent by other ONUs. In some embodiments, the specific time that an ONU will send its registration request is derived from its own ONU ID. In a specific implementation, a maximum of N (for example N=32, 64, or 128, more generally implementation specific) ONUs are allowed in the system, and as such, the RRP re-registration window is divided into N sub-windows each of which is associated with a respective ONU ID, notwithstanding whether there are actually that many ONUs present. Then, each ONU makes its re-registration attempt during its assigned sub-window, and if no ONU is assigned during a given sub-window, there will be no access attempt during that sub-window. The benefit of this method is that it only sends one re-registration window for all ONU registration request.

Graceful Recovery Process (C&M Plane Restoration)

The last step in the protection switching operation is the control and management plane restoration onto the switched-over fiber. This process is performed transparently to the applications, so as to eliminate any restart of those protocols between the OLT and each ONU. In the case of EPON, the control and management states that continue transparently could include the following, depending upon implementation:

OAM protocol state;
802.1x protocol state;
IGMP snooping state;
Internal management and control protocol states; and
Registration information (LLID and MAC addresses).

Protocol states typically rely on periodic exchange of information between the OLT and an ONU. The protocol states will be reset once the loss of peer communication is detected usually based on a configured keep-alive interval, or an underlying physical port state change. A typical keep-alive interval is in the neighborhood of a few seconds or more. So it is entirely possible to avoid the expiration of such keep-alive interval during the switch over, as long as the system, particularly the interface manager, does not report the link down event to those protocols.

Figure 7:
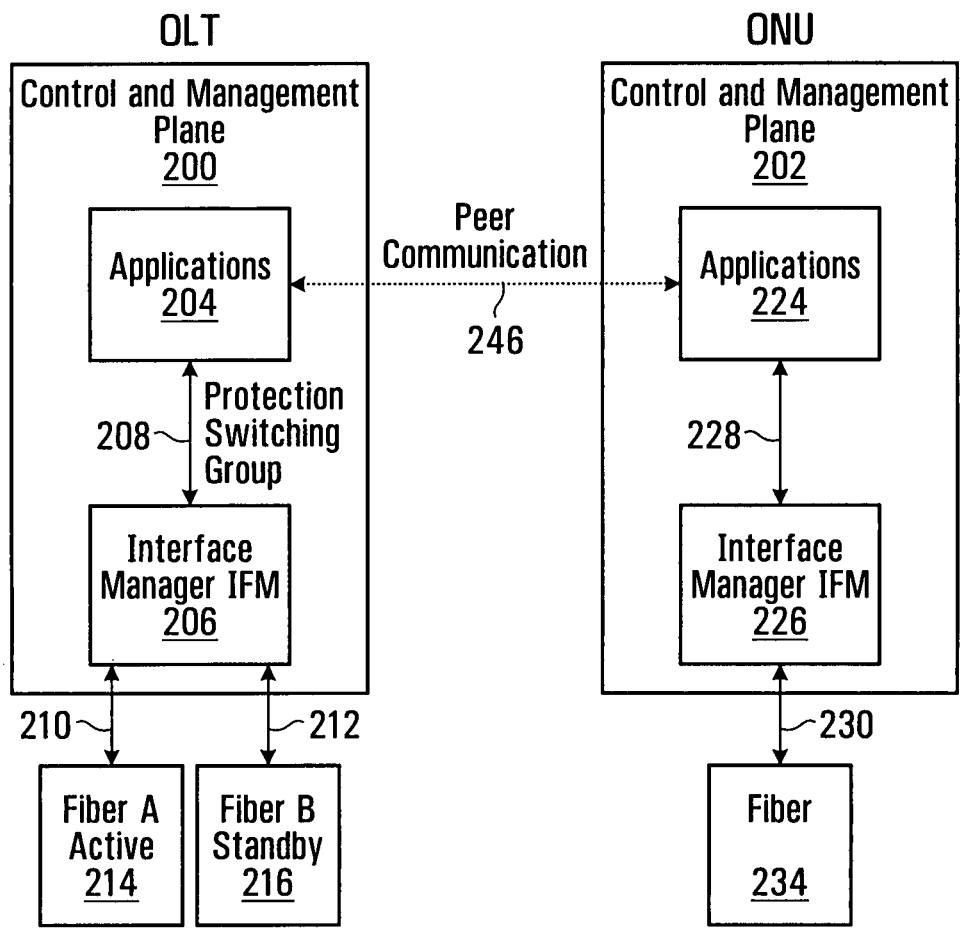
FIG. 7 is a block diagram of another PON architecture featuring 1:1 protection switching in accordance with an embodiment of the invention.

A specific method of achieving this will now be described with reference to FIG. 7. Shown is an OLT 200 and ONU 202. In practice, there may be multiple ONUs. The OLT 200 has applications 204. There is an interface manager (IFM) 206. There is a logical interface 208 between the applications 204 and the IFM 206. The IFM has physical interfaces 210,212 to fiber A 214 and fiber B 216 respectively. Similarly, the ONU 202 has applications 224. There is an interface manager (IFM) 226. There is a logical interface 228 between the applications 224 and the IFM 226. The IFM 226 has a physical interface 230 to fiber 234 respectively. Communications between the applications 204 of the OLT 200 and the applications 224 of the ONU 202 are indicated at 246. Not shown in FIG. 7 is the passive optical splitter/combiner that would link fiber A 214 and Fiber B 216 to a respective fiber 234 of each ONU 202.

The interface managers 206,226 are responsible for the maintenance of physical port states, which provides the interface service to the peer applications.

OLT Operation

In the OLT 200, a protection switching group (PSG) is defined as the logical interface 208 from the perspective of the applications 204. The interface manager groups two physical fiber ports in correspondence with the logical interface 208. One of the physical ports is configured to be active and the other standby. As long as at least one physical port remains operational, the PSG logical interface is always up from the perspective of application 204. The interface manager 206 is responsible for the active fiber port and the standby fiber port (ports 210,212, or ports 212,210, depending on the configuration at a given instant). The interface manager 206 presents the logical interface 208 as a single interface to the peer applications. The interface manager 206 configures the two optical ports equally with the identical configuration information such as traffic profile for each ONU. This can reduce the configuration time in the event of switch over.

The interface manager 206 monitors the state of the active optical port. Once the fiber failure has been detected as previously described, the interface manager 206 will change the state of the active optical port to the standby state, and the standby to the active state. However, so long as only a single fiber failure is detected, the interface manager 206 will not report a link teardown event to the peer applications 204 so that they will not immediately tear down or reset their protocol states. Of course they will still tear down if the keep-alive protocol fails, due to an extended protection switching time. If and only if both optical ports go down, the interface manager 206 will generate an interface down event and that will cause the peer applications 204 to reset their protocol states.

ONU Operation

Similarly, when the interface manager 226 at the ONU 202 detects a fiber cut (more generally, a discontinuity), it will not generate the interface down event to its peer applications 224 so that they will not immediately tear down or reset their protocol states. In some embodiments, the interface manager at the ONU 202 is configured with the graceful restoration dead interval (GRDI), which is designed to safe guard against the dead lock in case the restoration fails such as would be the case if both fibers were cut. If and only if the GRDI expires, the interface manager 226 will generate such an interface down event.

The method is graceful in a sense that the IFM 226 at the ONU 202 does not tear down the interface for the period of GRDI, so that the interface appears to be alive for the peer communication. In other words, the switchover event is transparent to the peer communication, so it does not cause the restart of protocols.

Figure 8:
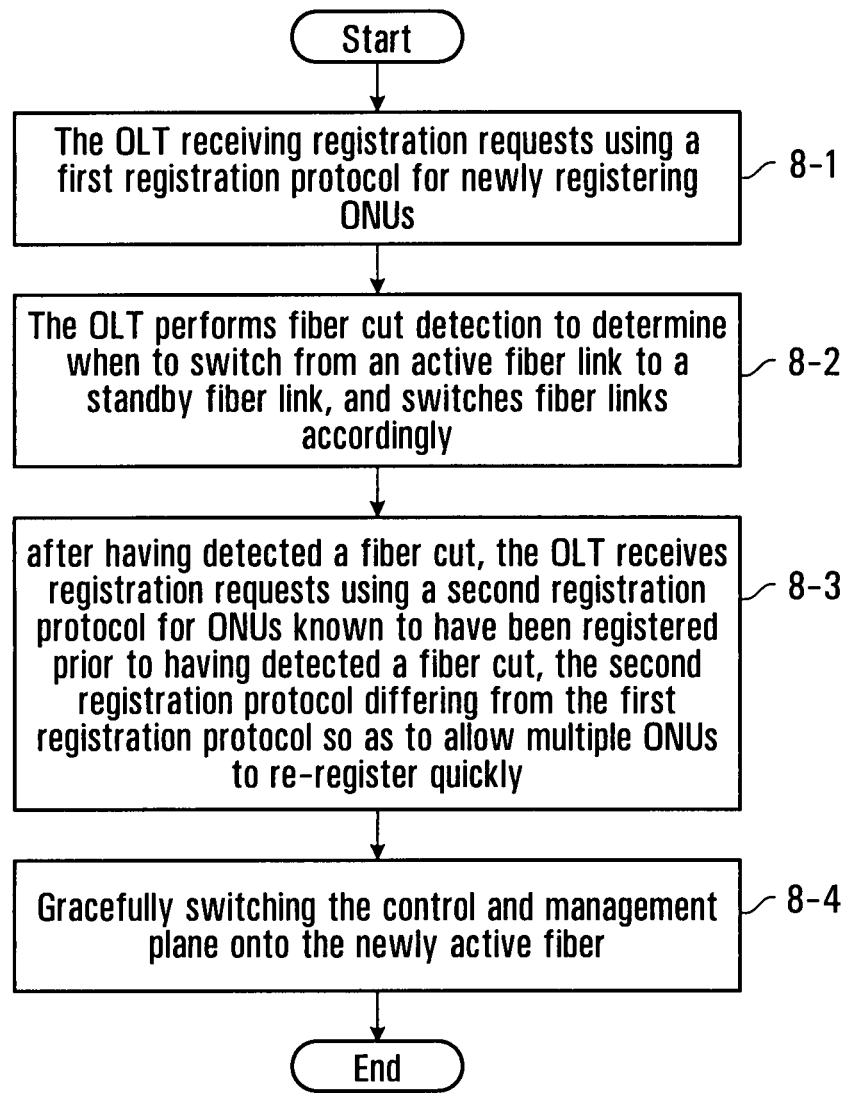
FIG. 8 is a flowchart of another method of performing protection switching in accordance with an embodiment of the invention.

Another method of performing protection switching will now be described with reference to FIG. 8. The method begins at step 8-1 with the OLT receiving registration requests using a first registration protocol for newly registering ONUs. This can be whatever registration protocol is used for this purpose, and can be an existing or new protocol. At step 8-2, the OLT performs fiber cut detection to determine when to switch from an active fiber link to a standby fiber link, and switching fiber links accordingly. At step 8-3, after having detected a fiber cut, the OLT receives registration requests using a second registration protocol for ONUs known to have been registered prior to having detected a fiber cut, the second registration protocol differing from the first registration protocol so as to allow multiple ONUs to re-register quickly. Various examples of such a "second registration protocol" have been provided previously. These include the use of re-registration window that is different from a normal discovery window, directed grants to previously registered ONUs, etc. However, more generally, this embodiment simply involves using a different protocol having detected a fiber cut than is used in the normal course of events. The method further involves, at step 8-4, gracefully switching the control and management plane onto the newly active fiber. This can involve, for example, after having detected a fiber cut, informing applications of link failure only upon failure to re-register using the standby fiber.

Numerous modifications and variations of the present invention are possible in light of the above teachings. It is therefore to be understood that within the scope of the appended claims, the invention may be practiced otherwise than as specifically described herein.

I claim:

1. A method of performing protection switching in a passive optical network, the method comprising:
configuring protection switching over an active fiber and a standby fiber;
performing communications discontinuity detection, and upon detecting a communications discontinuity switching from the active fiber to the standby fiber; the communications discontinuity resulting in loss of registration of at least one previously registered network unit;
performing data path restoration over the standby fiber through a rapid re-registration procedure, the rapid re-registration procedure being faster than a registration procedure used in the absence of having detected the communications discontinuity;
upon said rapid re-registration over the standby fiber, resuming control and management plane functions over the standby fiber.

2. The method of claim 1 applied in a passive optical network comprising an OLT (optical line termination) and at least one ONU (optical network unit), wherein performing communications discontinuity detection comprises:
the OLT performing at least one of:
a) monitoring received traffic, and if there is no received traffic received from any registered ONU within a configured period of time, declaring a fiber cut;
b) if an expected protocol message is not received from any registered ONU within a configured time interval, declaring a fiber cut; and
c) monitoring an optical signal, and declaring a fiber cut when there is a loss of optical signal;
each ONU performing at least one of:
d) monitoring received traffic, and if there is no received traffic received within a configured period of time, declaring a fiber cut;
e) if an expected protocol message is not received within a configured time interval, declaring a fiber cut; and
f) monitoring an optical signal, and declaring a fiber cut when there is a loss of optical signal.

3. The method of claim 1 applied in a passive optical network comprising an OLT (optical line termination) and at least one ONU (optical network unit), wherein performing data path restoration through a rapid re-registration procedure comprises:
the OLT advertising re-registration window information that allows multiple ONUs to re-register quickly after detecting the communications discontinuity, and the ONUs performing re-registration in accordance with the re-registration window information.

4. The method of claim 1 applied in a passive optical network comprising an OLT (optical line termination) and at least one ONU (optical network unit), wherein performing data path restoration through a rapid re-registration procedure comprises:
the OLT advertising a respective re-registration window for each ONU that was registered prior to detection of the communications discontinuity, and each ONU performing re-registration using the respective re-registration window.

5. The method of claim 1 applied in a passive optical network comprising an OLT (optical line termination) and at least one ONU (optical network unit), wherein performing data path restoration through a rapid re-registration procedure comprises:
the OLT advertising at least one re-registration window that is longer than a window used for initial registration, and the ONUs performing re-registration during the at least one re-registration window.

6. The method of claim 1 applied in a passive optical network comprising an OLT (optical line termination) and at least one ONU (optical network unit), wherein performing data path restoration through a rapid re-registration procedure comprises:
the OLT advertising a re-registration window that has a respective dedicated slot for re-registration for each ONU, and each ONU performing re-registration using the respective dedicated slot.

7. The method of claim 1 applied in a passive optical network comprising an OLT (optical line termination) and at least one ONU (optical network unit), wherein performing data path restoration through a rapid re-registration procedure comprises:
on an ongoing basis, the OLT maintaining data plane state for each ONU, the data plane state comprising at least an ONU ID;
during re-registration, the OLT assigning each ONU the same ONU ID as had been previously maintained.

8. The method of claim 7 wherein the data plane state comprises at least one of: ONU ID (ONU identifier), MAC address, LLID (logical link identifier), ONU traffic profiles, GEM (GPON encapsulation method) Port Identifier, and GPON Allocation ID.

9. The method of claim 1 applied in a passive optical network comprising an OLT (optical line termination) and at least one ONU (optical network unit), wherein performing data path restoration through a rapid re-registration procedure comprises:
upon detecting the communications discontinuity, the OLT making all upstream bandwidth available for re-registration until all ONUs have been re-registered successfully.

10. The method of claim 1 applied in a passive optical network comprising an OLT (optical line termination) and at least one ONU (optical network unit), wherein:
the OLT restarts at least one application used by the OLT only upon detection that both the active and standby fibers have failed; and
the ONU restarts the at least one application used by the ONU only after attempting to re-register has failed to succeed within a timeout window.

11. The method of claim 1 applied in a passive optical network comprising an OLT (optical line termination) and at least one ONU (optical network unit), the method further comprising the OLT managing interactions between the active fiber and standby fiber and the control and management plane by:
grouping the active fiber and the standby fiber into a protection switching group and presenting this as a single port to the control and management plane;
providing port information to applications pertaining to the single port by: a) providing a down event upon determining both fibers have failed; and b) providing an up event upon transitioning from a state in which both fibers have failed to a state in which at least one fiber is functional.

12. The method of claim 10 wherein the ONU restarting the at least one application used by the ONU after attempting to re-register has failed to succeed within a timeout window comprises:
defining the timeout window to be a GRDI (graceful recovery dead interval);
upon detecting the communications discontinuity, withholding the communications discontinuity event from the at least one application, and starting a timer;
upon the timer reaching the GRDI, informing the at least one application of the communications discontinuity;
the at least one application restarting in response to being informed of the communications discontinuity.

13. The method of claim 1 wherein at least one application in the control and management plane is intentionally kept unaware of the re-registration, except upon failure to re-register over the standby fiber, in which case the at least one application is restarted.

14. A method of performing protection switching in a passive optical network, the method comprising:
configuring protection switching over an active fiber and a standby fiber;
performing communications discontinuity detection, and upon detecting a communications discontinuity switching from the active fiber to the standby fiber; the communications discontinuity resulting in loss of registration of at least one previously registered network unit;
performing data path restoration over the standby fiber through a re-registration procedure, the re-registration procedure being faster than a registration procedure used in the absence of having detected the communications discontinuity;
upon said re-registration over the standby fiber, resuming control and management plane functions over the standby fiber.

15. The method of claim 14 applied in a passive optical network comprising an OLT (optical line termination) and at least one ONU (optical network unit), wherein performing communications discontinuity detection comprises:
the OLT performing at least one of:
a) monitoring received traffic, and if there is no received traffic received from any registered ONU within a configured period of time, declaring a fiber cut;
b) if an expected protocol message is not received from any registered ONU within a configured time interval, declaring a fiber cut; and
c) monitoring an optical signal, and declaring a fiber cut when there is a loss of optical signal;
each ONU performing at least one of:
d) monitoring received traffic, and if there is no received traffic received within a configured period of time, declaring a fiber cut;
e) if an expected protocol message is not received within a configured time interval, declaring a fiber cut; and
f) monitoring an optical signal, and declaring a fiber cut when there is a loss of optical signal.

16. The method of claim 15, wherein performing data path restoration comprises:
the OLT advertising a respective re-registration window for each ONU that was registered prior to detection of the communications discontinuity, and each ONU performing re-registration using the respective re-registration window.

17. The method of claim 15, wherein performing data path restoration comprises:
the OLT advertising at least one re-registration window that is longer than a window used for initial registration, and the ONUs performing re-registration during the at least one re-registration window.

18. The method of claim 15, wherein performing data path restoration comprises:
the OLT advertising a re-registration window that has a respective dedicated slot for re-registration for each ONU, and each ONU performing re-registration using the respective dedicated slot.

19. The method of claim 15, wherein:
the OLT restarts at least one application used by the OLT only upon detection that both the active and standby fibers have failed; and
the ONU restarts the at least one application used by the ONU only after attempting to re-register has failed to succeed within a timeout window.

20. The method of claim 15 wherein at least one application in the control and management plane is intentionally kept unaware of the re-registration, except upon failure to re-register over the standby fiber, in which case the at least one application is restarted.

* * * * *